UNITED STATES PATENT OFFICE.

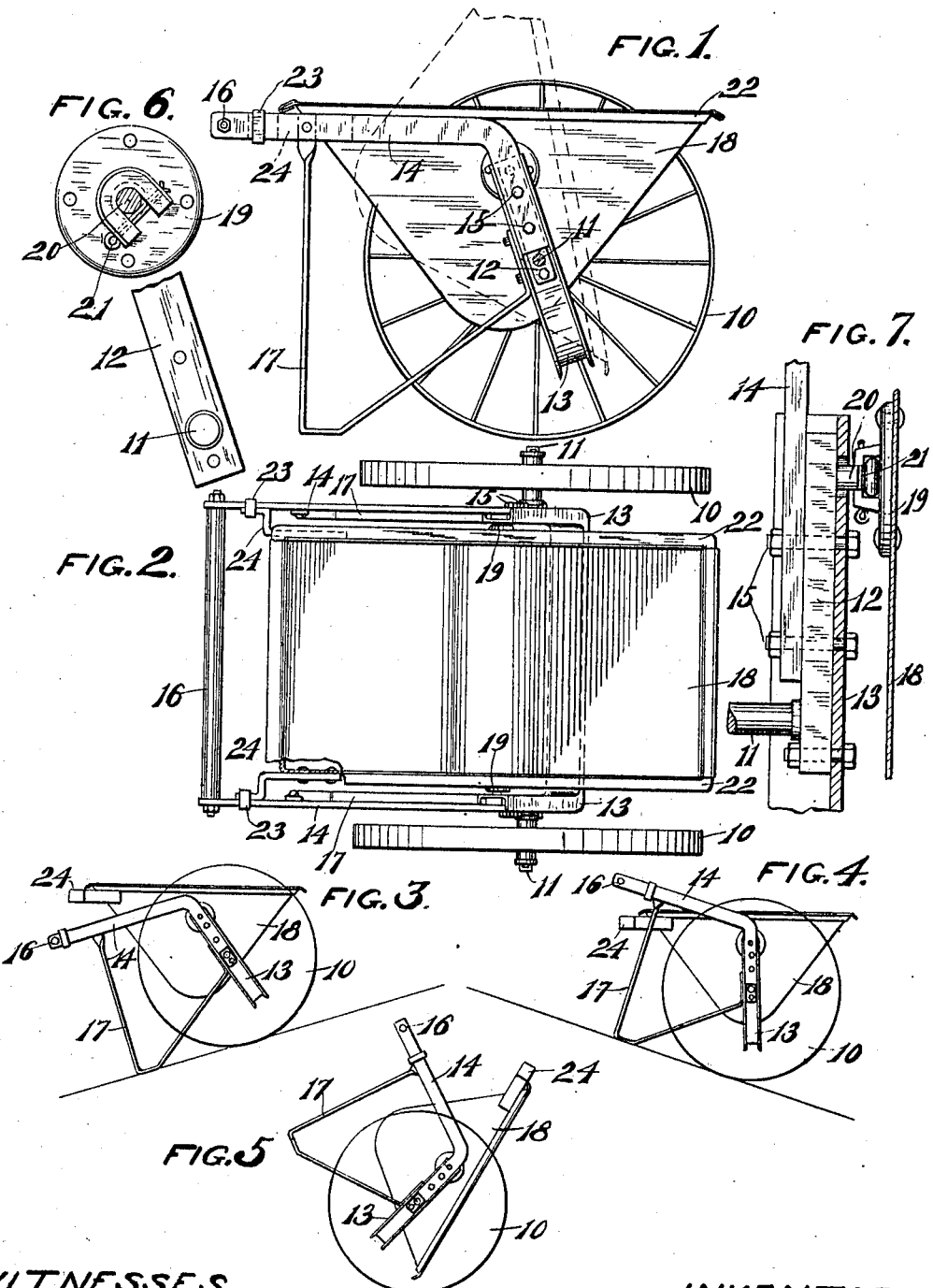

CHARLES A. BAKER, OF MILWAUKEE, WISCONSIN, ASSIGNOR TO STERLING WHEELBARROW COMPANY, OF MILWAUKEE, WISCONSIN, A CORPORATION OF WISCONSIN.

CONCRETE-CART.

970,457.  Specification of Letters Patent.  Patented Sept. 20, 1910.

Application filed October 22, 1908.  Serial No. 458,931.

*To all whom it may concern:*

Be it known that I, CHARLES A. BAKER, residing in Milwaukee, in the county of Milwaukee and State of Wisconsin, have invented new and useful Improvements in Concrete-Carts, of which the following is a description, reference being had to the accompanying drawings, which are a part of this specification.

This invention has for its object to provide a cart for carrying cement or other semi-liquid or liquid material which may be well filled without danger of the material splashing out of the tray, even though the cart is moved up or down an incline.

Another object of the invention is to provide such a cart with a tray which is capable of tilting to discharge its contents without necessitating the handle being raised.

Another object of the invention is to accomplish the foregoing objects by means of a cart having a tray pivotally mounted on a frame at points within the vertical plane through its center of gravity and above its center of gravity, whereby the tray with its contents will be suspended and remain in a horizontal position whether the cart is moved up or down an incline or on a level, and by reason of which mounting the tray may be independently swung to a position where it will discharge its contents.

With the above and other objects in view the invention consists in the concrete cart herein claimed, its parts and combinations of parts and all equivalents.

I desire it to be understood that this invention is not limited to any specific form or arrangement of parts except in so far as such limitations are specified in the claims, the construction herein shown and described being that selected for the purpose of illustrating the principles involved in the invention.

Referring to the accompanying drawings in which like characters of reference indicate the same parts in the different views; Figure 1 is a side elevation of a concrete cart constructed in accordance with this invention, the dumping position of the tray being shown in dotted lines; Fig. 2 is a plan view thereof with a portion broken away; Fig. 3 is a diagram showing the position of the tray when the cart is traveling up an incline; Fig. 4 is a similar view showing the position of the tray when the cart is passing down an incline; Fig. 5 is a similar view showing the position of the parts when the tray is being turned entirely over; Fig. 6 is a detail view showing parts of the pivotal connection; and, Fig. 7 is a detail sectional view thereof.

In these drawings 10 indicates a pair of wheels which are mounted upon pins 11 forming axles on the lower ends of metal bars 12 which are clamped within the side flanges of a U-shaped channel iron frame 13 forming a connecting means between the two wheels. Angularly bent side frames 14 also have their downwardly bent ends clamped within the flanges of the ends of the channel iron frame 13, there preferably being bolts 15 passing through the ends of the side frames 14, and through the metal bars 12 and the ends of the channel iron frame 13 to clamp them firmly together as shown in Fig. 7. The rear ends of the side frames 14 are connected by a tabular handle bar 16 and angular leg members 17 are bolted or riveted to the side members 14 and to the channel iron frame 13 as shown in Fig. 1 to support the parts in the positions shown when resting on the ground.

A V-shaped tray 18 is pivotally mounted between the side frames and within the U-shaped frame 13 by having socket plates 19 riveted or otherwise fastened to its sides in the vertical plane through the center of gravity thereof and above the level of the center of gravity, such socket plates fitting upon headed studs 20 on the metal bars 12. The metal bars and the headed studs and the axles 11 are preferably a single forging. The headed studs 20 are entered into the flanged sockets of the socket plates 19 through slots leading thereto, which slots make the sockets of a U-shape and are directed downwardly and forwardly, as shown in Fig. 6, when the tray is in its normal position, and cotter pins 21 are fastened across them to lock the headed studs therein and prevent their escaping when the tray is inverted. The position of the slot leading to the flanged socket for the headed stud is such that at all times when the tray is in a position to support a weight the closed portion of the socket bears upon the headed stud to form a stronger connection than would otherwise be the case.

The tray has an angle iron frame 22 around its rim which is adapted to strike against the channel iron U-shaped frame 13 when the tray is tilted to its dumping position, as shown in dotted lines in Fig. 1, but the tray may be locked to the handle by engaging rings 23 which loosely slide on the side frames 14 and are adapted to engage bent catches 24 secured to the rear end of the tray.

In operation the weight of the material in the tray 18 serves to hold the tray level at all times to prevent spilling the contents by reason of the pivotal connections for the tray being located in the vertical plane of the center of gravity of the tray and above the level of the center of gravity. The tray is free to swing on its pivotal connections when the rings 23 are disengaged to maintain its level whether the cart is traveling on a level surface or whether it is being pushed up an incline as shown in Fig. 3 or let down an incline as shown in Fig. 4.

The U-shaped frame 13 is sufficiently low to escape the bottom of the tray in its swinging movements to maintain its level position, but is adapted to be struck by the angle iron frame 22 around the rim of the tray when the tray is dumped. For dumping the tray it is not necessary to lift the handle, but by disconnecting the rings 23 the balanced tray may be easily swung to the position shown in dotted lines in Fig. 1, so that its bottom is on an incline and the liquid or semi-liquid material therein will be discharged, the blow struck by the flange 22 against the U-shaped frame serving to jar loose any material that may have become set. By tipping the tray more or less the quantity of material discharged may be varied to suit the will so that a partial discharge of any desired degree may be made.

In dumping the material from the tray there is no possibility of the cart running back on the operator, for the supporting frame remains bearing on the ground at such time and the position of the pivotal connections for the tray remains fixed in its relation to the pivotal connections for the frame in its supporting wheels.

If it is desired to entirely invert the tray for cleaning or other purposes the handle may be lifted as shown in Fig. 5 permitting the tray to be swung farther than as shown by dotted lines in Fig. 1 and until the tray rests flat upon the ground, which is permitted by the lowering of its pivotal sockets when they are carried over the axis of the wheels.

The tray may be quickly and easily disconnected from the frames by removing the cotter pins 31 and lifting it from the headed studs 20.

What I claim as my invention is:

1. A cart, comprising a U-shaped frame, metal bars secured to the ends of the U-shaped frame with outwardly extending axles at their lower ends and inwardly extending headed studs at their upper ends, wheels mounted on the axles, a handle connected with the U-shaped frame, and a tray having sockets pivotally mounted on the headed studs at points in a vertical plane through the center of gravity of the tray and above the center of gravity of the tray, whereby the tray may maintain its level position in different elevations of the handle.

2. A cart, comprising a U-shaped channel iron frame, metal bars secured to the ends of the U-shaped frame between the flanges thereof with outwardly extending axles at their lower ends and inwardly extending headed studs at their upper ends, wheels mounted on the axles, a handle connected with the U-shaped frame, socket plates having U-shaped flanged sockets pivotally mounted on the headed studs, a tray secured to the socket plates at points in a vertical plane through its center of gravity and above its center of gravity, and pins extending across the sockets of the socket plates to prevent the headed studs passing out therefrom.

3. A cart, comprising a U-shaped channel iron frame, metal bars secured to the ends of the U-shaped frame between the flanges thereof with outwardly extending axles at their lower ends and inwardly extending headed studs at their upper ends, wheels mounted on the axles, angular side frames also secured to the ends of the U-shaped frame and fitting between the flanges thereof, a handle connecting the ends of the side frame, socket plates having U-shaped flanged sockets fitting on the headed studs, cotter pins passing through the U-shaped sockets for preventing the studs passing out therefrom, a tray secured to the socket plates at points in a vertical plane through its center of gravity and above its center of gravity whereby the tray is capable of preserving its level position in different elevations of the handle, leg members secured to the side frames and the U-shaped frame, an angular catch on the tray, and a ring on one of the side frames to engage the catch and lock the tray to the side frame.

In testimony whereof, I affix my signature, in presence of two witnesses.

CHARLES A. BAKER.

Witnesses:
R. S. C. CALDWELL,
ANNA F. SCHMIDTBAUER.